(12) United States Patent
Golovatai-Schmidt et al.

(10) Patent No.: US 7,137,411 B2
(45) Date of Patent: Nov. 21, 2006

(54) ELECTROMAGNETIC HYDRAULIC VALVE, TYPICALLY A 3/2 DIRECTIONAL SWITCHING VALVE FOR CONTROLLING A VARIABLE VALVE TRAIN OF AN INTERNAL COMBUSTION ENGINE

(75) Inventors: Eduard Golovatai-Schmidt, Rottenbach (DE); Michael Kraemer, Korb (DE)

(73) Assignee: INA Schaeffler KG (DE)

( * ) Notice: Subject to any disclaimer, the term of this patent is extended or adjusted under 35 U.S.C. 154(b) by 201 days.

(21) Appl. No.: 11/016,186

(22) Filed: Dec. 17, 2004

(65) Prior Publication Data
US 2005/0189510 A1 Sep. 1, 2005

(30) Foreign Application Priority Data
Dec. 18, 2003 (DE) .............................. 103 59 363

(51) Int. Cl.
*F16K 31/06* (2006.01)
(52) U.S. Cl. ................................. 137/625.65
(58) Field of Classification Search ............ 137/625.65
See application file for complete search history.

(56) References Cited
U.S. PATENT DOCUMENTS

| 4,998,559 | A | * | 3/1991 | McAuliffe, Jr. | ......... | 137/625.65 |
| 5,577,534 | A | * | 11/1996 | Ward | ...................... | 137/625.65 |
| 5,651,391 | A | * | 7/1997 | Connolly et al. | ...... | 137/625.65 |
| 6,029,704 | A | * | 2/2000 | Kuroda et al. | ......... | 137/625.65 |
| 6,315,268 | B1 | | 11/2001 | Cornea et al. | | |
| 6,336,470 | B1 | * | 1/2002 | Zapf | ...................... | 137/625.65 |

FOREIGN PATENT DOCUMENTS

| DE | 197 29 935 A1 | 1/1999 |
| DE | 198 10 330 A1 | 9/1999 |
| DE | 199 08 440 A1 | 8/2000 |
| DE | 100 03 205 A1 | 11/2000 |

* cited by examiner

*Primary Examiner*—Justine R. Yu
*Assistant Examiner*—Andrew Rost
(74) *Attorney, Agent, or Firm*—Charles A. Muserlian

(57) ABSTRACT

The invention concerns a hydraulic valve (1) that comprises an electromagnet (2) having an armature (3), and a valve part (4) having at least two valve seats (5, 6). The electromagnet (2) is formed by a hollow cylindrical plastic coil spool (8), a coil winding (10) received in the coil spool (8) and a magnet housing (11) surrounding the coil winding (10), the hollow cylinder of the coil spool (8) being configured as an armature space (14) for the armature (3), into which armature space (14) an upper pole (15) and a lower pole (16) of the electromagnet (2) extend. The valve part (4) is formed by a hollow cylindrical valve housing (18) that comprises a pressure delivery connection (P) on one front end, as well as a load connection (A) and a tank connection (T) arranged on its peripheral surface and, pressed into its hollow cylinder, two cup-shaped deep-drawn parts (23, 24) comprising the valve seats (5, 6). The hydraulic valve (1) can be inserted with the valve part (4) into a complementary valve reception and comprises a fixing flange (26) through which it can be screwed, pressure-medium tight, on the valve reception. In the invention, at least the valve housing (18) of the valve part (4) and/or the lower pole (16) of the electromagnet (2) is configured as a separate part that can be made without chip removal, and the lower pole (16) is made integrally in one piece with the fixing flange (26) of the hydraulic valve (1) and also serves as a reception socket for the valve housing (18).

10 Claims, 3 Drawing Sheets

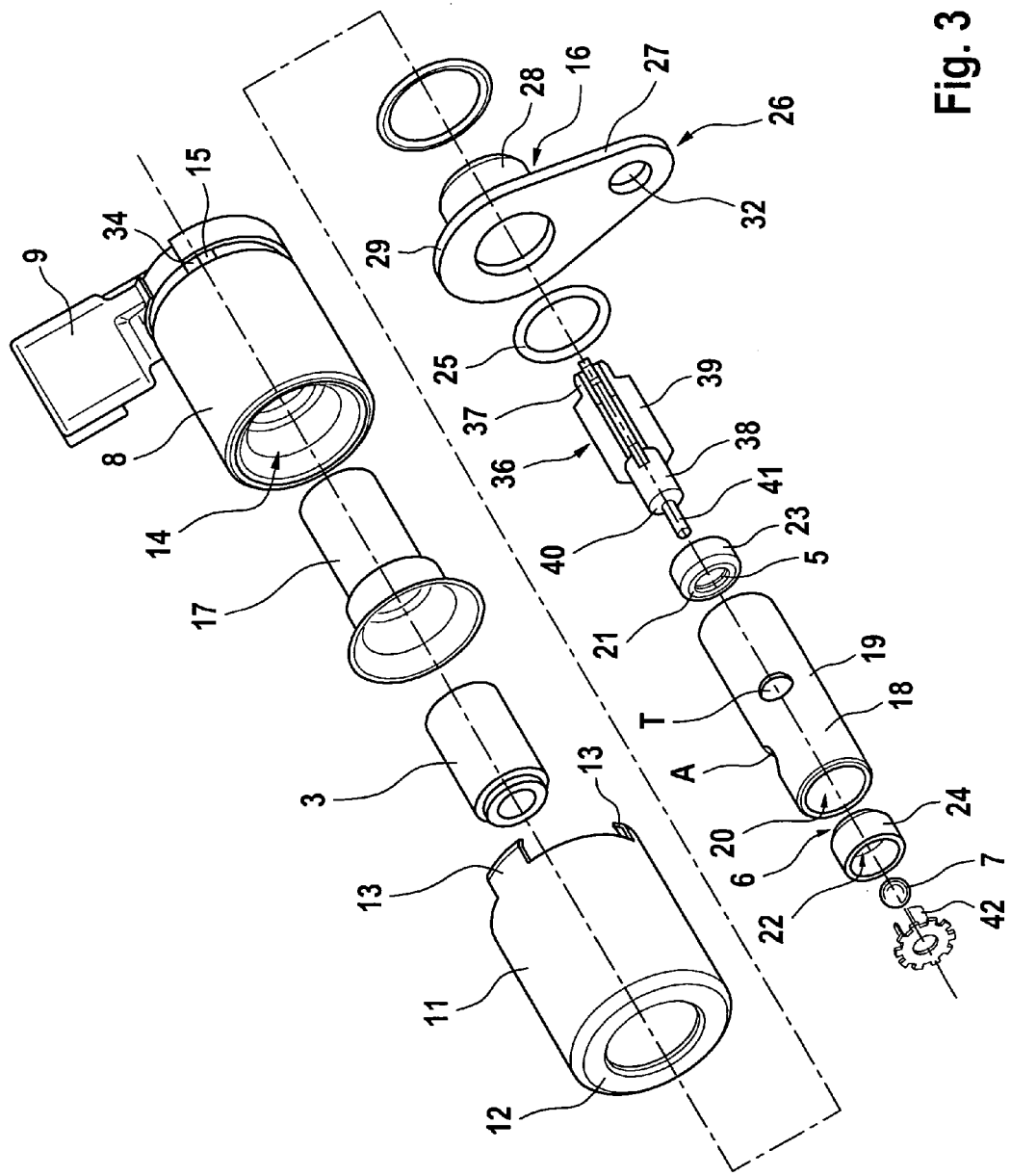

ELECTROMAGNETIC HYDRAULIC VALVE, TYPICALLY A 3/2 DIRECTIONAL SWITCHING VALVE FOR CONTROLLING A VARIABLE VALVE TRAIN OF AN INTERNAL COMBUSTION ENGINE

FIELD OF THE INVENTION

The invention concerns an electromagnetic hydraulic valve with the following features:

the hydraulic valve substantially comprises an electromagnet comprising an axially movable armature, a valve part comprising at least two valve seats and a closing ball corresponding to at least one of the valve seats, the electromagnet is formed by a hollow cylindrical plastic coil spool comprising an electric plug contact, at least one coil winding received in the coil spool and a magnet housing surrounding the coil winding, the magnet housing is configured as a cylinder tube sleeve whose one end is angled into an interior of the sleeve to form a circular ring-shaped bottom and whose other end comprises a plurality of turn-over tabs for connecting the magnet housing to the coil spool, a hollow cylinder of the plastic coil spool is configured at least partially as an armature space for the armature, into which armature space an upper pole and a lower pole of the electromagnet extend and which is lined with a non-magnetic metal sleeve, the valve part is formed by a hollow cylindrical valve housing that comprises a pressure delivery connection (P) on one front end, as well as a load connection (A) and a tank connection (T) that are made as radial holes in a cylinder jacket of the valve housing, inside a hollow cylinder of the valve housing is arranged respectively between the pressure delivery connection (P) and the load connection (A), and between the load connection (A) and the tank connection (T), one of the valve seats of the valve part, the valve seats of the valve part are made as axial apertures in bottoms of two cup-shaped deep-drawn parts that are fixed with peripheral surfaces in the hollow cylinder of the valve housing by a press fit, the hydraulic valve can be inserted with the valve part that comprises at least one outer sealing ring into a complementary valve reception, and the hydraulic valve further comprises a fixing flange through which the hydraulic valve can be screwed, pressure-medium tight, on the valve reception.

The invention can be particularly advantageously realized on a 3/2 directional switching valve for controlling a variable valve train of an internal combustion engine.

BACKGROUND OF THE INVENTION

DE 199 084 40 A1 discloses an electromagnetic hydraulic valve of a generic type that is configured as a 3/2 directional switching valve and generally comprises an electromagnet with an axially movable armature and a valve part with at least two valve seats and a closing ball that corresponds to at least one valve seat. The electromagnet is formed by a hollow cylindrical plastic coil spool with an electric plug contact, at least one coil winding received in the coil spool and a magnet housing surrounding the coil winding, the hollow cylinder of the plastic coil spool being configured at least partially as an armature space for the armature, which armature space is lined with a non-magnetic metal sleeve. The magnet housing of the electromagnet, in contrast, is configured as a cylinder tube sleeve whose one front end is angled into the interior of the sleeve to form a circular ring-shaped bottom and whose other front end comprises a plurality of turn-over tabs through which the magnet housing is connected to the plastic coil spool that can be inserted into the magnet housing. Further, a metal disk cast into the plastic coil spool and a pole core inserted into the hollow cylinder of the coil spool form an upper pole of the electromagnet, while its lower pole is formed by an extension of the valve part of the hydraulic valve, which extension can be inserted into the hollow cylinder of the coil spool and is conductively connected to the magnet housing through the bottom thereof. The valve part substantially comprises a hollow cylindrical valve housing that has a pressure delivery connection on one front end, as also a load connection and a tank connection that are made as radial holes in the cylinder jacket of the valve housing. Inside the hollow cylinder of the valve housing is arranged respectively between the pressure delivery connection and the load connection, and between the load connection and the tank connection, one of the valve seats of the valve part. Both valve seats are made as axial apertures in the bottoms of two cup-shaped deep-drawn parts that are fixed with their peripheral surfaces in the hollow cylinder of the valve housing and are connected to each other by a plastic sleeve. The loosely arranged closing ball of the valve part, that is operatively connected to the armature of the electromagnet through a tappet, is guided in this plastic sleeve. Through a compression spring arranged between the electromagnet and the pole core of the upper pole, the armature exerts, in a non-energized state of the electromagnet, a constant biasing force on the closing ball for closing the pressure delivery connection of the hydraulic valve. This hydraulic valve, thus configured as a magnetic pull valve, can be inserted with the valve part that comprises a plurality of outer sealing rings into a complementary valve reception. The hydraulic valve comprises a separate fixing flange which is arranged between the electromagnet and the valve part and through which the hydraulic valve can be screwed, pressure-medium tight, on the valve reception.

A drawback of this prior art electromagnetic hydraulic valve, however, is that it is composed of a relatively large number of separate parts some of which, for example the magnet housing and the valve seats, can certainly be made without chip removal. Other parts, however, like the valve housing of the valve part, as also the armature and the pole core of the upper pole of the electromagnet, have a relatively solid configuration and, due to their structural design, can only be fabricated by machining methods. However, due to the relatively long machine cycle times, the tools and equipment required and the material used, fabrication by machining methods causes considerable costs and, in the last analysis, has proved to be uneconomic. In addition, due to the large number of individual parts, the work and expense involved in the final assembly of the hydraulic valve are also increased so that, on the whole, the manufacturing costs of this prior art hydraulic valve can be expected to be disadvantageous.

OBJECT OF THE INVENTION

It is an object of the invention to provide an electromagnetic hydraulic valve, typically a 3/2 directional switching valve for controlling a variable valve train of an internal combustion engine, which valve is made up of relatively few separate parts of simple design and is characterized in that it causes less fabrication and assembly work and, thus also, low manufacturing costs.

This and other objects and advantages of the invention will become obvious from the following detailed description.

SUMMARY OF THE INVENTION

The invention achieves the above objects by the fact that at least one of the valve housing of the valve part and the lower pole of the electromagnet is configured as a separate part that can be made without chip removal, and that the lower pole is made integrally in one piece with the fixing flange of the hydraulic valve and also serves as a reception socket for the valve housing.

In an advantageous embodiment of the electromagnetic hydraulic valve of the invention, the valve housing of the valve part is configured as a simple cylindrical tube section that is separated with an accurate length from a long tube without chip removal. The load connection and the tank connection of the hydraulic valve are then made by punching axially offset radial holes in the jacket of the valve housing and, depending on the intended use, each of the two connections can be formed by a single radial hole or by two opposing radial holes in the jacket of the valve housing, the longitudinal axes of the connections being offset at 90° or arranged parallel to each other.

In a further development of the electromagnetic hydraulic valve of the invention, the lower pole of the electromagnet is configured as a web-and-collar sleeve that can be made by stamping and drawing and its web forms the fixing flange of the hydraulic valve. The sleeve part of this web-and-collar sleeve has an outer diameter that corresponds to the inner diameter of the metal sleeve that lines the armature space of the electromagnet and the sleeve part can be inserted into this metal sleeve so that the collar of the lower pole bears conductively against the bottom of the magnet housing of the electromagnet. Advantageously, one half of this collar has a radius that corresponds approximately to half the outer diameter of the magnet housing, while the other half of the collar merges with the fixing flange formed by the web of the lower pole. In an advantageous embodiment, this web tapers toward its free end which, again, has such a radius that a fixing hole for a screw can be arranged in the turning point of the radius.

In the bottom of its sleeve part, the lower pole further comprises a circular punched hole into which the armature sinks at least partially upon energization of the electromagnet. It has proved to be of particular advantage to match the diameter of the armature, starting from its valve-side end, at least partially exactly to the diameter of the circular punched hole, so that, due to the minimum interferric gap existing between the armature and the lower pole, an optimal transition of the magnetic flux lines from the armature to the lower pole can be achieved. The annular part of the bottom that remains on the sleeve part of the lower pole after the circular hole has been punched out, forms a two-sided axial stop which, on the magnet side limits the axial movement of the armature in one direction, and on the valve side, forms the assembling stop for the valve housing of the hydraulic valve that can be inserted into the sleeve part of the lower pole.

The mounting of the lower pole on the electromagnet is performed as follows: at first, the metal sleeve for lining the armature space of the electromagnet is inserted into the plastic coil spool, then, after interposing an O-sealing ring, the magnet housing is slipped onto the plastic coil spool and connected thereto by crimping. Following this, the armature is inserted into the armature space of the electromagnet and the lower pole is inserted with its sleeve part into the metal sleeve till the collar of the lower pole comes to bear against the bottom of the magnet housing. This makes it advantageously possible to join the lower pole and the magnet housing of the electromagnet to each other in a final step by spot or annular induction or laser welding.

In a further advantageous embodiment of the hydraulic valve of the invention, it is proposed to configure the upper pole of the electromagnet likewise as a collar sleeve that can be made by stamping and drawing and is cast into the plastic coil spool of the electromagnet. This collar sleeve bears with the inner surface of its sleeve part against the metal sleeve that lines the armature space of the electromagnet. The collar sleeve is conductively connected to the magnet housing through its collar that preferably extends at a right angle away from the sleeve part. For a positional fixing of the upper pole in the plastic coil spool, the collar of the upper pole comprises a plurality of recesses in which corresponding plastic transitions are formed during the injection molding of the plastic coil spool. The recesses are configured particularly advantageously in the form of four rectangular notches equally spaced on the periphery of the collar, but it is also possible to replace these with coaxial punched holes in the collar of the upper pole.

According to a further embodiment of the electromagnetic hydraulic valve of the invention, the armature of the electromagnet is configured as a hollow cylinder sleeve that is open on both sides and can likewise be made without chip removal by extrusion followed by punching out the bottom. A particularly suitable material for making the armature has proved to be a low carbon cold upset wire that is normalized after extrusion because it has good flow properties and at the same time, is a good magnetic flux conductor. The configuration of the armature in the form of a hollow cylinder sleeve has proved to be particularly advantageous due to its low weight because the armature thus possesses only a very low hysteresis. Advantageously, it is possible, at the same time, to insert into the valve side opening of the hollow cylinder sleeve, a centering peg of complementary shape arranged on a second closing body that is operatively connected to the closing ball and to one of the valve seats of the valve part, so that this closing body can be displaced free of axial and radial lash by the armature.

In an advantageous development of the hydraulic valve of the invention, the second closing body of the valve part is preferably configured as a plastic, injection molded part and substantially comprises a base body in the form of a cylindrical pin comprising a plurality of axial guide ribs formed radially on its peripheral surface. These axial guide ribs bear against the valve side end face of the armature and serve to center the second closing body within the valve housing. At the same time, the spacing between the individual axial guide ribs guarantees an internal pressure equalization between the space in the valve housing and the armature space of the electromagnet because the pressure medium can thus flow unhindered along the closing body and through separate transverse slots that cross the centering peg of the closing body as well as through the hollow space of the armature into and out of the armature space of the electromagnet. It has therefore proved to be particularly advantageous if three axial guide ribs offset at 120° to each other are provided on the peripheral surface of the base body and their guide surfaces are rounded to correspond to the inner diameter of the valve housing. It is, however, also conceivable to arrange more than three such axial guide ribs on the peripheral surface of the base body. The valve side end of the second closing body opposite from the centering peg is configured in the form of a closing cone that is operatively connected to the first valve seat of the hydraulic valve and merges axially with a tappet pin that is operatively connected to the loose closing ball for the second valve seat of the hydraulic valve. This closing ball is retained for axial displacement in a plastic cage that is formed in a punched disk that can be pressed into the opening of the valve housing. In the presence of pressure medium -pressure, this ball is permanently pressed into the second valve seat. It is thus guaranteed that, in the non-energized state of the electromagnetic, the pressure delivery connection of the hydraulic valve remains closed and the connection of the load connection to the tank connection of the hydraulic valve remains open.

Upon energization of the electromagnet, the connection between the pressure delivery connection and the tank connection is closed and, simultaneously, the connection between the pressure delivery connection and the load connection is opened by the fact that, via the tappet pin on its valve side end, the second closing body pushes the closing ball out of the second valve seat against the pressure of the hydraulic pressure medium. Through the now open second valve seat and the radial opening of the load connection above this in the valve housing, hydraulic medium can be supplied to the hydraulic consumer unit.

When current supply to the electromagnet is cut off, the loose closing ball is pressed again by the pressure medium pressure into the second valve seat in the valve housing, so that the pressure delivery connection of the hydraulic valve is closed again and, because of the connection of the closing ball to the tappet pin of the second closing body, both the closing body and the armature of the electromagnet are again displaced axially into their original positions.

The electromagnetic hydraulic valve of the invention, typically a 3/2 directional switching valve for controlling a variable valve train of an internal combustion engine, has the advantage over prior art hydraulic valves that, by the integration of otherwise separately configured parts, the total number of separate parts is reduced to a minimum and, in addition, these parts are so simply configured that all of them, without exception, can be made by non-machining fabrication methods. This reduces not only the expense and time of fabrication of the separate parts but also of the final assembly of the hydraulic valve, so that, as compared to prior art hydraulic valves, the hydraulic valve of the invention is characterized by particularly low manufacturing costs.

The invention will now be described more closely with reference to one example of embodiment and is shown in schematic representations in the appended drawings.

BRIEF DESCRIPTION OF THE DRAWINGS

FIG. 3 is an exploded view of the individual parts of the electromagnetic hydraulic valve of the invention.

DETAILED DESCRIPTION OF THE DRAWING

Figure 1:
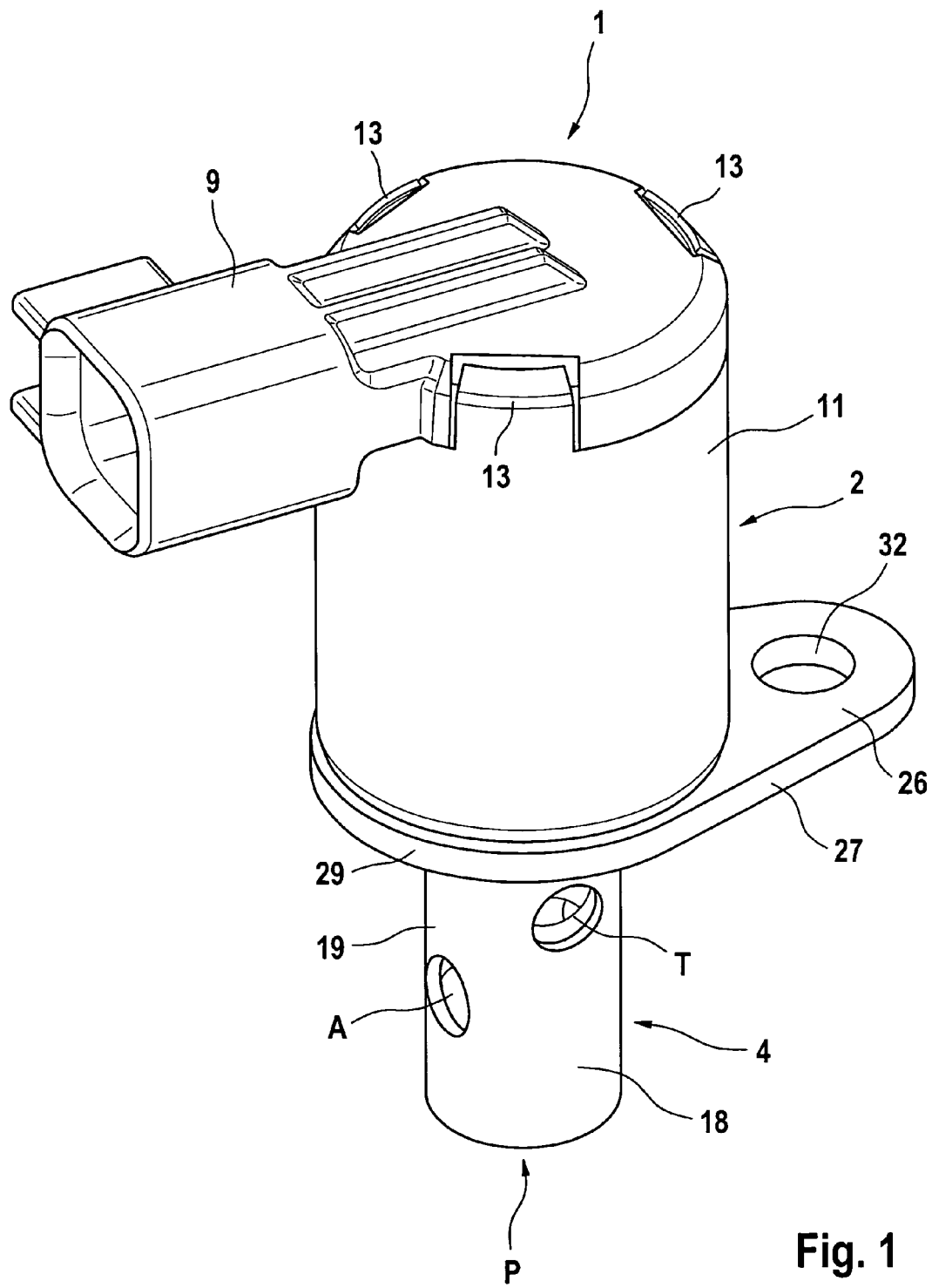
FIG. 1 is a three-dimensional overall view of an electromagnetic hydraulic valve of the invention.
Figure 2:
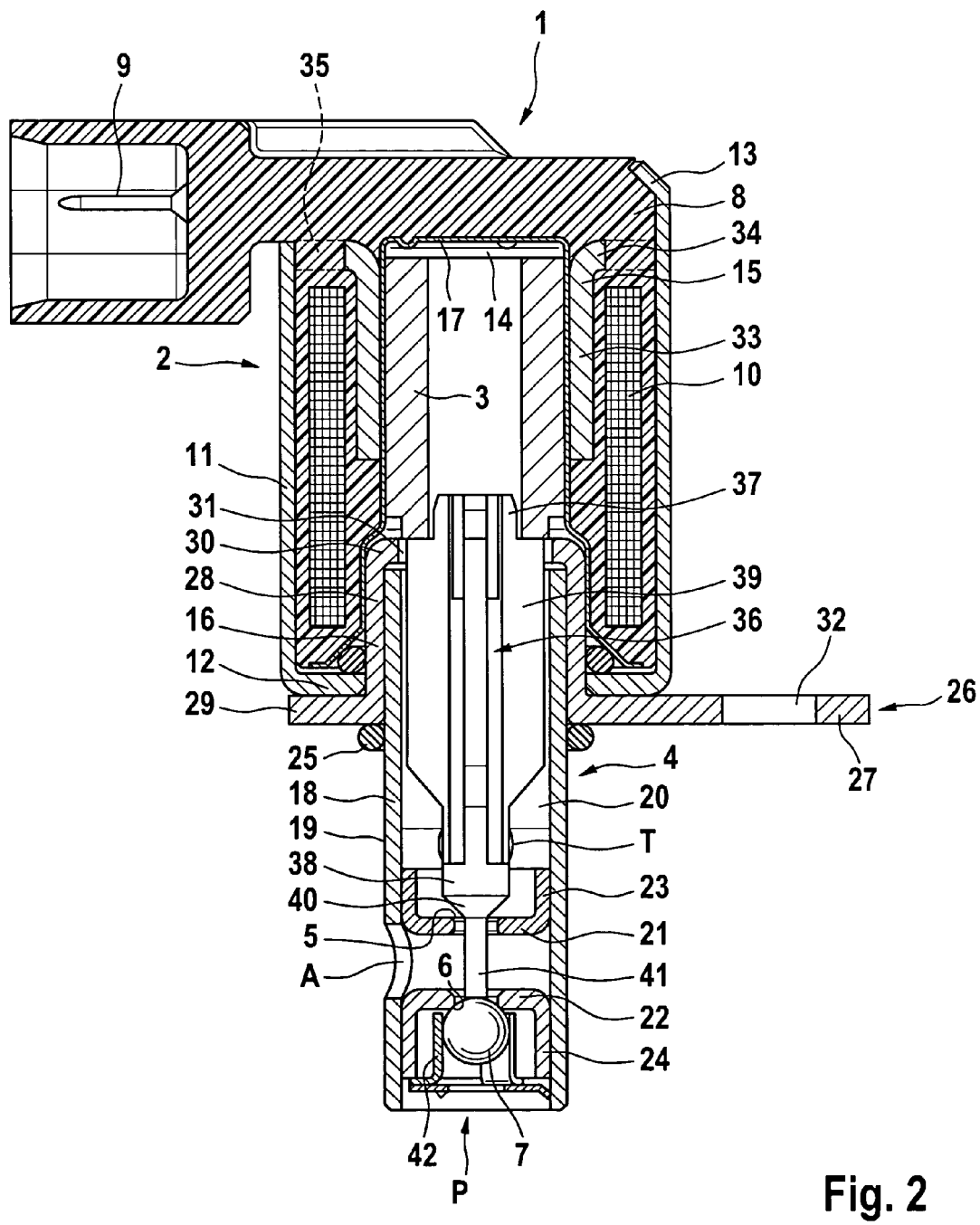
FIG. 2 is a cross-sectional view of the electromagnetic hydraulic valve of the invention.

FIGS. 1 to 3 clearly show an electromagnetic hydraulic valve 1 that is configured as a 3/2 directional switching valve for controlling a variable valve train of an internal combustion engine and substantially comprises an electromagnet 2 with an axially movable armature 3, a valve part 4 with a first and a second valve seat 5, 6 and a closing ball 7 corresponding to the second valve seat 6. The electromagnet 2 is formed by a hollow cylindrical plastic coil spool 8 having an electric plug contact 9, a coil winding 10 received in the coil spool 8 and a magnet housing 11 surrounding the coil winding 10. The magnet housing 11 is configured as a deep-drawn cylinder tube sleeve whose one end is angled into the sleeve interior to form a circular ring-shaped bottom 12, and whose other end comprises a plurality of turn-over tabs 13 for connecting the magnet housing 11 to the coil spool 8. The hollow cylinder of the plastic coil spool 8 is further configured in the usual manner as an armature space 14 for receiving the armature 3 of the electromagnet 2, into which armature space 14 an upper pole 15 and a lower pole 16 of the electromagnet 2 extend and which is lined with a non-magnetic metal sleeve 17.

The valve part 4 of the hydraulic valve 1, in contrast, as can likewise be seen in FIGS. 1 to 3, is formed by a hollow cylindrical valve housing 18 that has a pressure delivery connection P on one front end, as well as a load connection A and a tank connection T that are made as radial holes in the cylinder jacket 19 of the valve housing 18. FIGS. 2 and 3 show that inside the hollow cylinder 20 of the valve housing 18, is arranged respectively between the pressure delivery connection P and the load connection A, and between the load connection A and the tank connection T, one of the valve seats 5, 6 of the valve part 4, and that the valve seats 5, 6 are made as axial apertures in the bottoms 21, 22 of two cup-shaped deep-drawn parts 23, 24 that are fixed with their peripheral surfaces in the hollow cylinder 20 of the valve housing 18 by a press fit. With the thus configured valve part 4, the hydraulic valve 1 can be inserted into a complementary valve reception, not illustrated, and can be screwed through a laterally projecting fixing flange 26 on the internal combustion engine next to the valve reception, the valve part 4 additionally comprising an outer sealing ring 25 for sealing the valve reception against leakage of pressure medium.

As can further be clearly seen, particularly in FIGS. 2 and 3, with the aim of reducing fabrication and assembly costs and thus minimizing manufacturing costs of the hydraulic valve 1 on the whole, the valve housing 18 of the valve part 4, the lower pole 16 of the electromagnet 2 and other parts are configured according to the invention as separate parts that can be made without chip removal. For reducing the number of components and for a further reduction of costs, the lower pole 16 is made together with the fixing flange 26 of the hydraulic valve 1 as an integral one-piece component that also forms a reception socket for the valve housing 18 of the valve part 4.

From the exploded view of the hydraulic valve 1 in FIG. 3, it can be seen further that the valve housing 18 of the valve part 4 is configured as a simple cylindrical tube section that is separated with an accurate length from a long tube without chip removal and comprises the load connection A and the tank connection T of the hydraulic valve 1, which connections are constituted by simple radial holes made by axially and radially offset punching at 90° from each other in the jacket 19 of the tube section.

The illustration of FIG. 3 further shows that the lower pole 16 of the electromagnet 2 is configured as a web-and-collar sleeve that can be made by stamping and drawing and whose web 27 is configured as a fixing flange 26 of the hydraulic valve 1. As shown in FIG. 2, the sleeve part of this web-and-collar sleeve can be inserted into the metal sleeve 17 of the electromagnet 2, so that its collar 29 bears conductively against the bottom 12 of the magnet housing 11, and the lower pole 16 can be joined to the magnet housing 11 of the electromagnet 2 by induction spot welding. In the bottom 30 of its sleeve part 28, the lower pole 16 further comprises a circular punched hole 31 into which the armature 3 partially sinks upon energization of the electromagnet 2. To achieve an optimal transition of the magnetic flux lines from the armature 3 to the lower pole 16, the diameter of the armature 3 is matched at its valve side end through an integrally formed step to the diameter of the punched hole 31 in the bottom 30 of the lower pole 16.

It can likewise be seen from FIG. 2 that the upper pole 15 of the electromagnet 2 is also configured as a collar sleeve that can be made without chip removal by stamping and drawing and is cast into the plastic coil spool 8 of the electromagnet 2 to bear with the inner surface of its sleeve part 33 against the metal sleeve 17 of the electromagnet 2. On the periphery of its collar 34, the upper pole 15 comprises a plurality of recesses 35 that form plastic transitions for the positional fixing of the upper pole 15 in the plastic coil spool 8, while the rest of the collar 34 of the upper pole 15, as roughly indicated in FIG. 3, is conductively connected to the magnet housing 11.

From the individual parts shown in FIG. 3, it finally also becomes clear that the armature 3 of the electromagnet 2 configured as a hollow cylinder sleeve open at both ends can likewise be made without chip removal by extrusion. The bottom that is formed during fabrication is subsequently removed by punching to obtain a through-going hollow cylinder of the armature 3 thus permitting an internal pressure equalization-between the hollow cylinder 20 of the valve housing 18 and the armature space 14 of the electromagnet 2. The valve side opening of the hollow cylinder of the armature 3 can be used at the same time for the insertion of the centering peg 37 of a second closing body 36 that is operatively connected to the closing ball 7 and the valve seat 5 of the valve part 4.

This second closing body 36 configured as a plastic, injection molded part can best be seen in FIGS. 2 and 3 which show that this closing body 36 substantially comprises a cylindrical pin 38 having three axial guide ribs 39 formed radially on its peripheral surface at an offset of 120° to each other. At their armature side ends, these axial guide ribs 39 bear against the end of the armature 3 and serve to center the second closing body 36 within the valve housing 18. The valve side end of the second closing body 36 opposite from the centering peg 37 is configured in the form of a closing cone 40 that is operatively connected to the first valve seat 5 and merges axially with a tappet pin 41 that is operatively connected to the loose closing ball 7 for the second valve seat 6. The loose closing ball 7 is retained for axial displacement within a plastic cage 42 that is formed in a punched disk that can be pressed into the opening of the valve housing 18 and guarantees an exact seating of the closing ball 7 in the valve seat 6.

The invention claimed is:

1. An electromagnetic hydraulic valve with following features:
    the hydraulic valve comprising an electromagnet comprising an axially movable armature, a valve part comprising at least two valve seats and a closing ball corresponding to at least one of the valve seats,
    the electromagnet is formed by a hollow cylindrical plastic coil spool comprising an electric plug contact, at least one coil winding received in the coil spool and a magnet housing surrounding the coil winding,
    the magnet housing is configured as a cylinder tube sleeve whose one end is angled into an interior of the sleeve to form a circular ring-shaped bottom and whose other end comprises a plurality of turn-over tabs for connecting the magnet housing to the coil spool,
    a hollow cylinder of the plastic coil spool is configured at least partially as an armature space for the armature, into which armature space an upper pole and a lower pole of the electromagnet extend and which is lined with a non-magnetic metal sleeve,
    the valve part is formed by a hollow cylindrical valve housing that comprises a pressure delivery connection (P) on one front end, as well as a load connection (A) and a tank connection (T) that are made as radial holes in a cylinder jacket of the valve housing,
    inside a hollow cylinder of the valve housing is arranged respectively between the pressure delivery connection (P) and the load connection (A), and between the load connection (A) and the tank connection (T), one of the valve seats of the valve part,
    the valve seats of the valve part are made as axial apertures in bottoms of two cup-shaped deep-drawn parts that are fixed with peripheral surfaces in the hollow cylinder of the valve housing by a press fit,
    the hydraulic valve can be inserted with the valve part that comprises at least one outer sealing ring into a complementary valve reception, and the hydraulic valve comprises a fixing flange through which the hydraulic valve can be screwed, pressure-medium tight, on the valve reception,
  wherein
    at least one of the valve housing of the valve part and the lower pole of the electromagnet is configured as a separate part that can be made without chip removal, and
    the lower pole is made integrally in one piece with the fixing flange of the hydraulic valve and also serves as a reception socket for the valve housing.

2. A hydraulic valve of claim 1, wherein
    the valve housing of the valve part is configured as a simple cylinder tube section that is separated with an accurate length from a long tube without chip removal, and
    the load connection (A) and the tank connection (T) are made in the tube section by axially offset punching of radial holes in a jacket of the tube section of the valve housing.

3. A hydraulic valve of claim 1, wherein
    the lower pole of the electromagnet is configured as a web-and-collar sleeve that can be made by stamping and drawing, a web of the web-and-collar sleeve being configured as the fixing flange of the hydraulic valve, and
    a sleeve part of the web-and-collar sleeve can be inserted into the metal sleeve of the electromagnet, so that a collar of the web-and-collar sleeve bears conductively against a bottom of the magnet housing.

4. A hydraulic valve of claim 3, wherein
    the lower pole comprises in a bottom of the sleeve part, a circular punched hole into which the armature sinks at least partially upon energization of the electromagnet.

5. A hydraulic valve of claim 3, wherein
the lower pole and the magnet housing of the electromagnet are joined to each other by spot or annular induction or laser welding.

6. A hydraulic valve of claim 1, wherein
the upper pole of the electromagnet is likewise configured as a collar sleeve that can be made by stamping and drawing and is cast into the plastic coil spool,
this collar sleeve bears with an inner surface of a sleeve part against the metal sleeve of the electromagnet, and is conductively connected to the magnet housing through a collar.

7. A hydraulic valve of claim 6, wherein
the collar of the upper pole comprises a plurality of peripherally arranged recesses that serve as plastic transitions for a positional fixing of the upper pole in the plastic coil spool.

8. A hydraulic valve of claim 1, wherein
the armature of the electromagnet is configured as a hollow cylinder sleeve that is open on both sides and can likewise be made without chip removal by extrusion with subsequent punching-out of a bottom, and
a centering peg of a second closing body that is operatively connected to the closing ball and to one of the seats of the valve part, projects into a hollow cylinder of said hollow cylinder sleeve.

9. A hydraulic valve of claim 8, wherein
the second closing body is configured as a plastic, injection molded part and substantially comprises a cylindrical pin on whose outer peripheral surface a plurality of axial guide ribs are formed radially, and
on a valve side end, the second closing body comprises a closing cone that is operatively connected to one of the valve seats, and a tappet pin that is operatively connected to the closing ball.

10. A hydraulic valve of claim 1 configured as a 3/2 directional switching valve for controlling a variable valve train of an internal combustion engine.

* * * * *